US011191064B2

(12) United States Patent
Xiong et al.

(10) Patent No.: US 11,191,064 B2
(45) Date of Patent: Nov. 30, 2021

(54) TRANSMISSION OF COMMON CONTROL MESSAGES FOR MACHINE-TYPE COMMUNICATION (MTC) USER EQUIPMENTS WITH REDUCED BANDWIDTH

(71) Applicant: Apple Inc., Cupertino, CA (US)

(72) Inventors: Gang Xiong, Beaverton, OR (US); Seunghee Han, San Jose, CA (US); Debdeep Chatterjee, Mountain View, CA (US); Jong-Kae Fwu, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 95 days.

(21) Appl. No.: 15/501,152

(22) PCT Filed: Jun. 4, 2015

(86) PCT No.: PCT/US2015/034274
§ 371 (c)(1),
(2) Date: Feb. 1, 2017

(87) PCT Pub. No.: WO2016/048422
PCT Pub. Date: Mar. 31, 2016

(65) Prior Publication Data
US 2017/0230951 A1    Aug. 10, 2017

Related U.S. Application Data

(60) Provisional application No. 62/055,515, filed on Sep. 25, 2014.

(51) Int. Cl.
*H04W 72/04* (2009.01)
*H04W 4/70* (2018.01)
(Continued)

(52) U.S. Cl.
CPC ......... *H04W 72/042* (2013.01); *H04L 5/0044* (2013.01); *H04L 5/0053* (2013.01);
(Continued)

(58) Field of Classification Search
USPC ........................................................ 370/330
See application file for complete search history.

(56) References Cited

U.S. PATENT DOCUMENTS 9,462,548 B1 * 10/2016 Govindassamy ........................... H04W 52/0229
2007/0260851 A1    11/2007 Taha et al.
(Continued)

FOREIGN PATENT DOCUMENTS

| CN | 103444221 A | 12/2013 |
| CN | 103733561 A | 4/2014 |

(Continued)

OTHER PUBLICATIONS

European Patent Office—Partial Supplementary European Search Report dated Apr. 26, 2018 from European Patent Application No. 15843194.0, 18 pages.

(Continued)

*Primary Examiner* — Gregory B Sefcheck
*Assistant Examiner* — Majid Esmaeilian
(74) *Attorney, Agent, or Firm* — Fish & Richardson P.C.

(57) ABSTRACT

Embodiments described herein relate generally to a communication between a user equipment (UE) and an evolved Node B (eNB). The UE and eNB may perform enhanced physical downlink control channel (EPDCCH)-less operation for scheduling of one or more common control messages, such as one or more system information blocks (SIBs), a random access response (RAR) message, or a paging message. Additionally, or alternatively, an eNB may configure a subset of aggregation levels for the search space (Continued)

of the UE to use for receiving a physical downlink control channel (PDCCH) or enhanced PDCCH (EPDCCH). Other embodiments may be described and/or claimed.

20 Claims, 6 Drawing Sheets

(51) Int. Cl.
  *H04L 5/00* (2006.01)
  *H04W 48/12* (2009.01)
  *H04W 74/08* (2009.01)
  *H04W 48/16* (2009.01)
(52) U.S. Cl.
  CPC ............. *H04W 4/70* (2018.02); *H04W 48/12* (2013.01); *H04W 74/0833* (2013.01); *H04L 5/0007* (2013.01); *H04W 48/16* (2013.01)

(56) References Cited

U.S. PATENT DOCUMENTS

| | | | |
|---|---|---|---|
| 2011/0194501 A1 | 8/2011 | Chung et al. | |
| 2012/0327894 A1 | 12/2012 | Axmon et al. | |
| 2012/0327895 A1* | 12/2012 | Wallen | H04W 48/12 370/330 |
| 2013/0083749 A1 | 4/2013 | Xu et al. | |
| 2013/0136098 A1* | 5/2013 | Li | H04W 72/042 370/330 |
| 2013/0252613 A1* | 9/2013 | Charbit | H04W 36/30 455/437 |
| 2013/0301467 A1 | 11/2013 | Kang et al. | |
| 2014/0003386 A1 | 2/2014 | Han et al. | |
| 2014/0098761 A1 | 4/2014 | Lee et al. | |
| 2014/0146768 A1* | 5/2014 | Seo | H04L 5/001 370/329 |
| 2014/0204866 A1* | 7/2014 | Siomina | H04L 25/03821 370/329 |
| 2015/0098421 A1* | 4/2015 | Barbieri | H04W 72/042 370/329 |
| 2015/0103800 A1* | 4/2015 | Seo | H04W 48/16 370/330 |
| 2015/0189574 A1* | 7/2015 | Ng | H04W 24/08 370/252 |
| 2016/0037514 A1* | 2/2016 | Xiong | H04W 4/70 370/336 |
| 2016/0150462 A1* | 5/2016 | Yang | H04W 74/0833 370/254 |
| 2016/0165640 A1* | 6/2016 | Yang | H04W 74/08 370/336 |
| 2016/0212686 A1* | 7/2016 | Viorel | H04W 72/04 |

FOREIGN PATENT DOCUMENTS

| | | |
|---|---|---|
| KR | 10-2010-0135378 A | 12/2010 |
| KR | 10-2014-0009930 A | 1/2014 |
| TW | 201342860 A | 10/2013 |
| WO | 2010/032714 A1 | 3/2010 |
| WO | WO 2013155459 | 10/2013 |
| WO | 2014/109566 A1 | 7/2014 |
| WO | 2016018526 A1 | 2/2016 |

OTHER PUBLICATIONS

Sierra Wireless, "Summary of email discussion on Low Cost UE scheduling Options," 3GPP TSG RAN WG1 #76bis, R1-141171, Agenda Item: 7.2.2.1, March 31-Apr. 4, 2014, Shenzhen, China, 22 pages.
Japanese Patent Office—Office Action dated Apr. 10, 2018 from Japanese Patent Application No. 2017-508989, 8 pages.
European Patent Office—Extended Search Report dated Aug. 6, 2018 from European Application No. 15843194.0, 15 pages.
International Search Report and Written Opinion for International Application No. PCT/US2015/034274 dated Sep. 17, 2015; 17 pages.
Alcatel-Lucent, Alcatel-Lucent Shanghai Bell; "Coverage enhancement for RACH messages," 3GPP TSG-RAN WG1 Meeting #76, R1-140153, Agenda item: 7.2.2.2.2; Prague, Czech Republic, Feb. 10-14, 2014; 6 pages.
Alcatel-Lucent, Alcatel-Lucent Shanghai Bell; "PBCH Coverage Enhancement for MTC UE," 3GPP TSG-RAN WG1 Meeting #75, R1-135154, Agenda item: 6.2.2.2.1; San Francisco, USA, Nov. 11-15, 2013; 4 pages.
Ericsson; "On common control channels for enhanced coverage MTC UE," 3GPP TSG RAN WG1 Meeting #76, R1-140746, Agenda Item: 7.2.2.2.3; Prague, Czech Republic, Feb. 10-14, 2014; 3 pages.
Mediatek Inc.; "On the need of PDCCH for SIB, RAR and Paging," 3GPP TSG-RAN WG1 #76, R1-140239, Agenda Item: 7.2.2.2.3; Prague, Czech Republic, Feb. 10-14, 2014; 5 pages.
Mediatek Inc.; "Analysis on (E)PDCCH search space design in coverage enhancement mode," 3GPP TSG-RAN WG1 #76, R1-140240, Agenda Item: 7.2.2.2.3; Prague, Czech Republic, Feb. 10-14, 2014; 6 pages.
Sony; "Necessity of PDCCH for common messages for coverage extended MTC UEs," 3GPP TSG RAN WG1 #76, R1-140584, Agenda Item: 7.2.2.2.3; Prague, Czech Republic, Feb. 10-14, 2014; 6 pages.
3GPP TS 36.213 V12.2.0 (Jun. 2014); "Technical Specification Group Radio Access Network; Evolved Universal Terrestrial Radio Access (E-UTRA); Physical layer procedures (Release 12)," 207 pages.
Ericsson, Nokia Networks; "New WI proposal: Further LTE Physical Layer Enhancements for MTC," Agenda Item: 14.1.1; 3GPP TSG RAN Meeting #65 RP-141660; Edinburgh, Scotland, Sep. 9-12, 2014; 9 pages.
Taiwan Patent Office; Office Action dated Oct. 31, 2016 for Patent Application No. 104127490; 12 pages.
Taiwan Patent Office—Office Action dated Mar. 26, 2018 from Taiwan Divisional Application No. 106121105, 12 pages.
Ericsson; "On common control channels for enhanced coverage MTC UE," 3GPP TSG RAN WG1 Meeting #76 R1-140746, Agenda Item: 7.2.2.2.3; Prague, Czech Republic, Feb. 10-14, 2014; 2 pages.
Mediatek Inc.; "Analysis on (E)PDCCH search space design in coverage enhancement mode," 3GPP TSG-RAN WG1 #76 R1-140240, Agenda Item: 7.2.2.2.3; Prague, Czech Republic, Feb. 10-14, 2014; 5 pages.
Korean Patent Office; Office Action issued for Patent Application No. 2017-7004980 dated Jul. 7, 2017; 17 pages.
Sony; "Necessity of PDCCH for common messages for coverage extended MTC UEs," 3GPP TSG RAN WG1 #76 R1-140584, Agenda Item: 7.2.2.2.3; Prague, Czech Republic, Feb. 10-14, 2014; 5 pages.
European Patent Office—Article 94(3) mailed Apr. 29, 2019 from European Patent Application No. 15843194.0, 5 pages.
Japanese Patent Office—Decision to Refuse dated Nov. 6, 2018 from Japanese Application No. 2017-508989, 6 pages.
PCT International Preliminary Report on Patentability in International Appln. No. PCT/US2015/034274, dated Apr. 6, 2017, 12 pages.

* cited by examiner

TRANSMISSION OF COMMON CONTROL MESSAGES FOR MACHINE-TYPE COMMUNICATION (MTC) USER EQUIPMENTS WITH REDUCED BANDWIDTH

CROSS REFERENCE TO RELATED APPLICATIONS

The present application is a national phase entry under 35 U.S.C. § 371 of International Application No. PCT/US2015/034274, filed Jun. 4, 2015, entitled "TRANSMISSION OF COMMON CONTROL MESSAGES FOR MACHINE-TYPE COMMUNICATION (MTC) USER EQUIPMENTS WITH REDUCED BANDWIDTH", which claims priority under 35 U.S.C. § 119(e) to U.S. Provisional Patent Application No. 62/055,515, entitled "ON THE TRANSMISSION OF COMMON CONTROL MESSAGES FOR MTC UES WITH REDUCED BANDWIDTH" filed Sep. 25, 2014, the disclosures of which are hereby incorporated by reference herein their entireties.

FIELD

Embodiments of the present invention relate generally to the technical field of data processing, and more particularly, to computer devices operable to communicate data over a network.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by their inclusion in this section.

Machine-type communication (MTC) is a technology that may enable ubiquitous computing environments towards the concept of the "Internet of Things" (IoT). Potential MTC-based applications include smart metering, healthcare monitoring, remote security surveillance, intelligent transportation systems, and so forth. These services and applications may stimulate the design and development of a new type of MTC device that may be seamlessly integrated into current and future generation mobile broadband networks.

Existing mobile broadband networks are designed to optimize performance mainly for human-type communications. Therefore, existing networks may not be adapted or optimized for MTC-related requirements. MTC-specific designs may be explored, for example, by the 3rd Generation Partnership Project (3GPP). Future 3GPP specifications may support different network design, which may improve MTC-type communication.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they may mean at least one.

DETAILED DESCRIPTION

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A or B" and "A and/or B" means (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the terms "module" and/or "logic" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, circuitry may be implemented in, or functions associated with the circuitry may be implemented by, one or more software or firmware modules.

Figure 1:
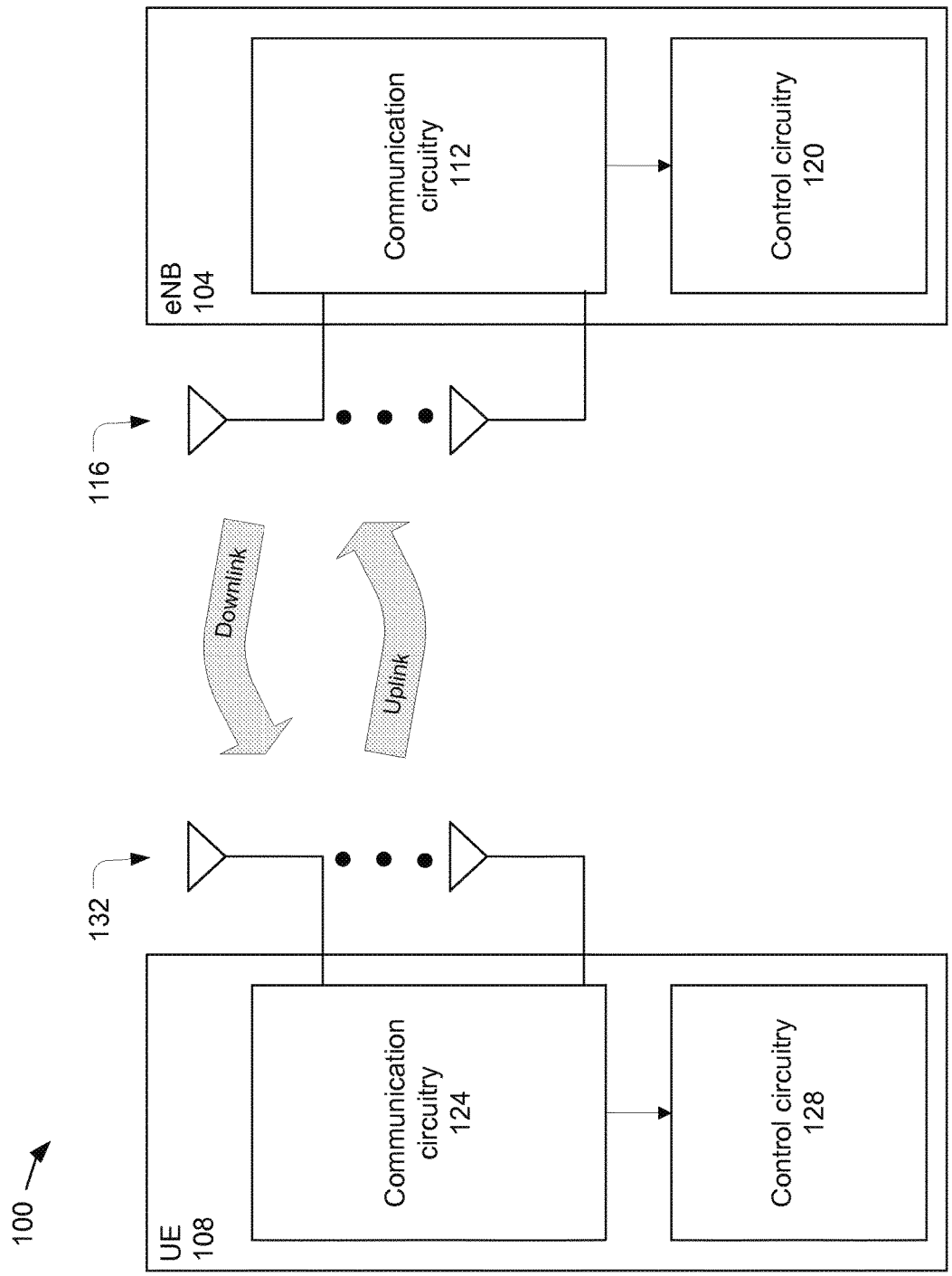
FIG. 1 is a block diagram showing a wireless communication environment including an evolved Node B (eNB) and a user equipment (UE), in accordance with various embodiments.

FIG. 1 schematically illustrates a wireless communication environment 100 in accordance with various embodiments. The environment 100 may include a UE 108 in wireless communication with an access node such as evolved node B (eNB) 104. The eNB 104 may be part of a 3rd Generation Partnership Project (3GPP) long-term evolution (LTE) network (or an LTE-Advanced (LTE-A) network). In particular, the eNB 104 may be part of a radio access network (RAN) of the LTE/LTE-A network, such as an evolved universal terrestrial radio access network (E-UTRAN). The E-UTRAN may be coupled with a core network such as an Evolved Packet Core (EPC) that performs various management and control functions of the LTE/LTE-A network and further provides a communication interface between various RANs and other networks.

The eNB 104 may include communication circuitry 112 to receive uplink transmissions from UE 108 via one or more antennas 116 and transmit downlink transmissions to UE 108 via the one or more antennas 116. eNB 104 may also include control circuitry 120 coupled with communication circuitry 112. In embodiments control circuitry 120 may be configured to decode and encode information transmitted in signals communicated between UE 108 and eNB 104.

UE 108 may include communication circuitry 124, control circuitry 128, and one or more antennas 132. Communication circuitry 124 may be coupled with the one or more antennas 132 to receive downlink transmission from eNB 104 and transmit uplink transmissions to eNB 104. Control circuitry 128 may be coupled to communication circuitry 124, and may be configured to decode and encode information transmitted in signals communicated between the UE 108 and the eNB 104. Control circuitry 128 may further be configured to perform any portion of the processes described below.

The UE 108 may be any type of computing device equipped with broadband circuitry and adapted to operate on a cell of a wireless communication network according to, for example, one or more 3GPP technical specifications. The wireless cell may be provided by the eNB 104. In embodiments, the UE 108 may be adapted for machine-type communication (MTC). For example, the UE 108 may be a computing device that is not primarily adapted for human-type communications (HTC) (e.g., voice calling, text/instant messaging, web browsing), such as a smart metering device, payment device (e.g., a "pay-as-you-drive" device), a vending machine, a telematics system (e.g., a system adapted for tracking and tracing of vehicles), an appliance, a security system (e.g., a surveillance device), and the like.

In various embodiments, the transmission bandwidth for communication between the eNB 104 and the UE 108 may be less for UEs 108 that are MTC UEs and/or in an enhanced coverage mode (e.g., when the UE is located at or near the edge of the cell, experiences poor radio link conditions (e.g., due to its reduced capabilities owing to complexity reduction, or experiences significant building penetration loss as a result of being deep inside of a building (e.g., in the basement for a smart meter type of application)) than for HTC UEs. The reduced bandwidth may apply to data channels and/or control channels. In some embodiments, the transmission bandwidth for communications of the UE 108 that is an MTC UE with reduced bandwidth may be 1.4 Megahertz (MHz).

In existing wireless networks, a physical downlink control channel (PDCCH) with common search space can be utilized to schedule the transmission of common control messages, such as system information blocks (SIBs), random access response (RAR) messages, and/or paging messages. Alternatively, a common search space can be defined for a physical downlink control channel for UEs that is based on enhanced PDCCH (EPDCCH) to schedule the transmissions of common control messages. The common control messages may be transmitted to a plurality of UEs. Given that the transmission of common control messages needs to support cell-edge UEs, high aggregation levels, e.g., aggregation levels including 8 control channel elements (CCEs) having 288 resource elements (REs) or 16 CCEs having 576 REs, may be used for EPDCCH transmission. In this case, at least 5 orthogonal frequency division multiplexing (OFDM) symbols for the PDCCH or 3 physical resource blocks (PRBs) for EPDCCH with common search space are needed within allocated MTC resources. Accordingly, the transmission of PDCCH or EPDCCH may incur substantial control overhead at the system level and increased power consumption for MTC UEs with reduced bandwidth or for UEs operating coverage enhancements.

In various embodiments, the UE 108 and eNB 104 may use EPDCCH-less operation for scheduling of one or more common control messages, such as one or more SIBs, a RAR message transmission, and/or a paging message. In EPDCCH-less operation, one or more common control messages may be scheduled without use of a PDCCH or EPDCCH. For example, the eNB scheduling information that indicates a time and frequency resource (e.g., of a physical downlink shared channel (PDSCH)) for a common control message may be included in a master information block (MIB) or a SIB transmitted by the eNB 104 to the UE 108. The common control messages may be transmitted by the eNB 104 on a physical downlink channel, such as a PDSCH.

For instance, in some embodiments, the UE 108 may receive an MIB from the eNB 104 on a physical broadcast channel (PBCH). The MIB may include scheduling information to indicate a time and frequency resource of a PDSCH for a SIB. The control circuitry 128 of the UE may receive (e.g., via the communication 124 and antennas 132) the SIB in the time and frequency resource of the PDSCH based on the scheduling information. In some embodiments, the SIB may be SIB1.

In some embodiments, the SIB may include scheduling information to indicate another time and frequency resource for another SIB. The control circuitry 128 of the UE 108 may receive the other SIB in the other time and frequency resource based on the further scheduling information. For example, in some embodiments the MIB may include scheduling information for SIB1, and SIB1 may include scheduling information for SIB2. In some embodiments, SIB1 may further include scheduling information for one or more further SIBs (e.g., SIB3, SIB4). Alternatively, or additionally, SIB2 or another SIB may include scheduling information for one or more further SIBs (e.g., SIB3, SIB4, etc.).

In some embodiments, the SIBs transmitted to MTC UEs and/or UEs in enhanced coverage may be different from the SIBs transmitted to other UEs (e.g., HTC UEs in normal coverage).

In various embodiments, the MIB, a SIB (e.g., SIB1, SIB2, or another SIB) may include scheduling information to indicate a time and frequency resource for a random access response (RAR) message or a paging message. For example, in one embodiment, the scheduling information for the RAR message and/or paging message may be included in SIB2. The control circuitry 128 may communicate on the RAR message or paging message based on the information.

In various embodiments, the scheduling information that is indicated to the UE 108 for the common control messages (e.g., SIB, RAR message, paging message) may include one or a combination of: a bitmap of the subframes used for the transmission of the common control message, the starting subframe of the common control message (e.g., with respect to system frame number (SFN) 0), the periodicity of the common control message, the frequency location of the common control message, modulation and coding scheme (MCS), and/or configuration information associated with repeated transmission of the common control message (further discussed below).

In some embodiments, for the RAR message, a fixed timing gap between physical random access channel (PRACH) transmission and a corresponding RAR message may be included in the scheduling information to facilitate efficient decoding of RAR messages by the UE 108. Additionally, or alternatively, in some embodiments, the frequency location of the SIB transmission may be different from the frequency locations of the RAR message and/or paging message. The different frequencies may provide scheduling flexibility for the eNB 104. In some embodiments, the scheduling information may indicate a window of time and frequency resources (e.g., a set of subframes) in which the RAR message or paging message may be transmitted. The UE 108 may monitor the window of time and frequency resources for the RAR message or paging message. The UE 108 may decode the RAR message or paging message if it detects one in the window.

In various embodiments, the EPDCCH-less operation of the UE 108 and eNB 104 may reduce control overhead for the UE 108 compared with alternative techniques in which a PDCCH and/or EPDCCH with common search space are used to schedule resources for the UE 108. In one embodiment, all the resources in the legacy data region are allocated for the transmission of common control messages.

Alternatively, in some embodiments, the SIB, RAR message, and/or paging message may be located in the time and/or frequency domain in a predetermined manner. Accordingly, the scheduling information for the SIB, RAR message, and/or paging message may be predefined. For example, the time and/or frequency location may be determined at least in part by a function of physical cell ID, system frame number (SFN), subframe number, slot number, a corresponding radio network temporary identifier (RNTI) (e.g., SI-RNTI for SIB, RA-RNTI for RAR, P-RNTI for paging), or a type of communication associated with the time and frequency resource. The type of communication may be, for example, SIB, RAR, or paging transmission. For example, in some embodiments, a type identifier may be used to determine the resource location, where the type identifier has a first value (e.g., 0) for a SIB, a second value (e.g., 1) for a RAR message, or a third value (e.g., 2) for a paging message. In some embodiments, the time location (e.g., SFN, slot number, subframe number) may be predetermined in accordance with the type of message (e.g., SIB, RAR, paging), and the frequency location may be determined by one or more of the parameters listed above.

In some embodiments, an EPDCCH may be used to schedule some common control messages but not others. For example, EPDCCH-less operation may be used to schedule SIB transmission, while an EPDCCH with common search space may be used to schedule a RAR and/or paging transmission.

In some embodiments, the eNB 104 may repeat transmission of the common control messages (e.g., SIB, RAR message, and/or paging message) across multiple subframes. The eNB 104 may use, for example, chase combining or incremental redundancy for the repeated transmissions. If incremental redundancy is used, the redundancy version (RV) may be made known to the UE via higher layer or Layer 1 signaling to improve decoding performance.

In some embodiments, the use of chase combining or incremental redundancy for repeated transmissions of the common control messages may be predefined. The redundancy version may also be predefined. In one example, a predefined redundancy version pattern of [0 2] may be used for incremental redundancy with 2 repeated transmissions. Additionally or alternatively, for incremental redundancy with 4 repeated transmissions, a predefined RV pattern of [0 2 1 3] or [0 2 3 1] may be used.

Alternatively, the UE 108 may receive (e.g., from the eNB 104) an indicator to indicate whether the control circuitry 128 is to use chase combining or incremental redundancy to decode the common control message. The indicator may be transmitted by higher layers (e.g., in a SIB, in a dedicated radio resource control (RRC) message, or via Layer 1 dynamic signaling carried by the PDCCH or EPDCCH) in some embodiments. Additionally, or alternatively, the UE 108 may receive an RV indicator that indicates the redundancy version pattern to be used for incremental redundancy transmissions.

In another embodiment, the redundancy version pattern, but not the indication of whether chase combining or incremental redundancy is used, may be directly predefined or configured by higher layer signaling. The UE 108 may determine whether chase combining or incremental redundancy is used for the repeated transmissions based on the redundancy version pattern. For example, a redundancy version pattern of [0 0] may indicate that chase combining is used, while a redundancy version pattern of [0 1] may indicate that incremental redundancy is used.

Additionally, or alternatively, the number of subframes used for repeated transmission of the common control messages may be predefined or may be configured by the eNB 104 for the UE 108 using higher layer signaling. Furthermore, in some embodiments, repeated transmission may be used for some common control messages but not others (e.g., based on the TBS of the common control message). For example, in some embodiments, the eNB 104 may use repeated transmission to send SIBs to the UE 108, but may not use repeated transmission for the RAR and/or paging message.

In some embodiments, the eNB 104 may use frequency hopping in conjunction with the repeated transmission to further improve the link level performance. For example, the eNB 104 may use different frequencies to send different iterations of the repeated transmission (e.g., a first frequency for a first transmission of the SIB and a second frequency for a second transmission of the SIB). The parameters for frequency hopping may be predefined or may be configured by the eNB 104 for the UE 108 using higher layer signaling.

The repeated transmission of the common control messages, such as the SIBs, RAR message, and/or paging message may not be limited to common control messages that are transmitted using EPDCCH-less operation. Accordingly, in some embodiments, the repeated transmission of the common control messages may be used when the common control messages are scheduled dynamically using a PDCCH or EPDCCH. The scheduling PDCCH or EPDCCH may also be transmitted with repetitions in time.

As discussed above, the scheduling information that is indicated to the UE 108 for the common control messages (e.g., SIBs, RAR message, paging message) may include configuration information associated with repeated transmission of the common control message. The configuration information may include, for example, the number of repeated subframes, the type of repeated transmission (e.g., Chase combining or incremental redundancy), the redundancy version of the repeated transmission, and/or parameters for frequency hopping.

In various embodiments, the UE 108 may be allocated an MTC resource (e.g., time and frequency resource) for unicast transmission. In some embodiments, the MTC resource can be UE-specific (e.g., designated for the UE 108). The UE-specific MTC resource may be configured, for example, via RRC signaling. Alternatively, the allocated MTC resource for the UE 108 may be cell-specific (e.g., allocated for MTC UEs associated with the same cell). The cell-specific MTC resource may be configured via SIB or RRC signaling, for example.

In some embodiments, whether for MTC UEs or non-MTC UEs, the eNB 104 may transmit a PDCCH or EPDCCH. The UE 108 may attempt to decode a PDCCH or EPDCCH on all possible PDCCH candidates or EPDCCH candidates, respectively, in the UE-specific and/or common search space (referred to as blind decoding attempts). The PDCCH candidates and EPDCCH candidates may correspond to a group of CCEs on which the eNB 104 may transmit the PDCCH or EPDCCH. The PDCCH candidates and EPDCCH candidates may be determined according to a predefined algorithm, and may depend on the aggregation level of the PDCCH or EPDCCH. For example, Table 1 (adapted from Table 9.1.1-1 in 3GPP Technical Specification 36.213) illustrates PDCCH candidates that may be monitored by a UE in UE-specific and common search spaces for different aggregation levels in accordance with some embodiments.

TABLE 1

| Type | Search space $s_k^{(L)}$ Aggregation level L | Size [in CCEs] | Number of PDCCH candidates $M^{(L)}$ |
|---|---|---|---|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

In a similar manner, the UE may monitor EPDCCH candidates with different aggregation levels and in the UE-specific and/or common search space. Accordingly, the UE 108 may need to make many blind decoding attempts to monitor all of the PDCCH candidates and/or EPDCCH candidates. The blind decoding attempts may incur substantial power consumption.

In some embodiments, a subset of aggregation levels may be defined for the UE 108, and the UE 108 may make blind decoding attempts for the PDCCH candidates or EPDCCH candidates associated with the subset of aggregation levels. The UE 108 may not make blind decoding attempts for candidates associated with aggregation levels that are not included in the subset of aggregation levels.

In some embodiments, the subset of aggregation levels may be predefined for the UE 108. For example, MTC UEs with reduced bandwidth may be predefined to use a subset of aggregation levels for blind decoding attempts that includes less than all aggregation levels used by other UEs (e.g., HTC UEs).

Alternatively, or additionally, the eNB 104 may configure the subset of aggregation levels for the UE 108 via signaling. For example, the eNB 104 may transmit higher layer signaling, such as SIB or RRC signaling, to the UE 108 that indicates the subset of aggregation levels for the UE 108 to use for blind decoding attempts of PDCCH or EPDCCH candidates.

In some embodiments, the eNB 104 may dynamically adjust the aggregation levels included in the subset of aggregation levels for the UE 108 based on one or more parameters. For example, the eNB 104 may determine one or more aggregation levels to include in the subset of aggregation levels based on a location of the UE 108 (e.g., whether the UE 108 is near the cell edge or not), a received signal received power (RSRP)/path loss measurement report received from the UE 108. For instance, when the eNB 104 determines that the UE 108 is located in or near the cell center, the eNB 104 may configure the UE 108 with lower aggregation levels (e.g., aggregation levels that include 1 and 2 CCEs). In contrast, when the eNB 104 determines that the UE 108 is experiencing poor radio link conditions, the eNB 104 may configure the UE 108 with higher aggregation levels (e.g., aggregation levels that include 4 or 8 CCEs (and/or 16 CCEs in the case of EPDCCH)).

Additionally, or alternatively, the aggregation levels included in the subset of aggregation levels may be determined based on whether the UE 108 is in normal coverage mode or enhanced coverage mode.

In various embodiments, the subset of aggregation levels may reduce the number of blind decoding attempts made by the UE 108, thereby reducing power consumption. In some embodiments, the subset of aggregation levels may be used for non-MTC UEs in addition to or instead of MTC UEs.

Figure 2:
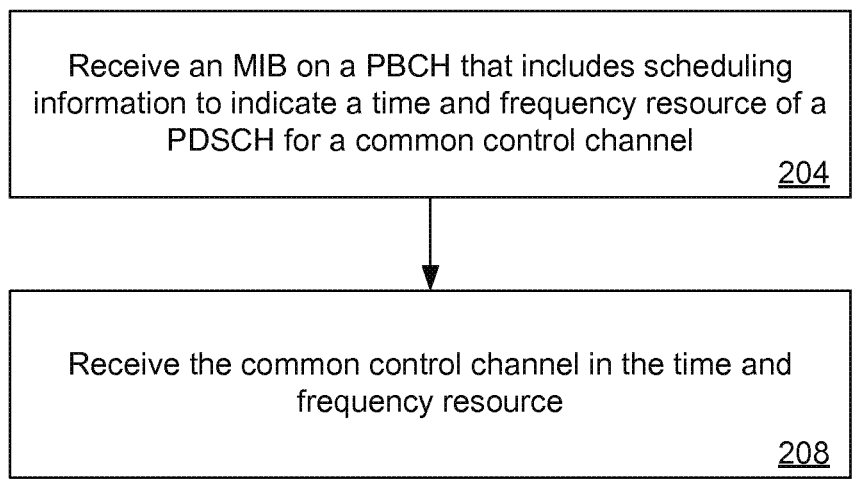
FIG. 2 is a flow diagram illustrating a method for EPDCCH-less operation that may be performed by a UE, in accordance with various embodiments.

FIG. 2 illustrates a method 200 that may be performed by a UE (e.g., UE 108) for EPDCCH-less operation in accordance with various embodiments. In some embodiments, the UE may include one or more non-transitory computer-readable media having instructions, stored thereon, that when executed case the UE to perform the method 200.

At 204 of the method 200, the UE may receive an MIB on a PBCH that includes scheduling information to indicate a time and frequency resource of a PDSCH for a common control message. The common control message may be, for example, a SIB, a RAR message, and/or a paging message. The scheduling information may include, for example, one or more of: a bitmap of the subframes used for the transmission of the common control message, the starting subframe of the common control message (e.g., with respect to SFN0), the periodicity of the common control message, the frequency location of the common control message, an MCS for the common control message, and/or configuration information associated with repeated transmission of the common control message (e.g., the number of repeated subframes, the type of repeated transmission (e.g., Chase combining or incremental redundancy), the redundancy version of the repeated transmission, and/or parameters for frequency hopping).

At 208 of the method 200, the UE may receive the common control message in the time and frequency resource. The MIB and/or common control message may be received from an eNB (e.g., eNB 104).

In some embodiments, the MIB may include scheduling information for SIB1, SIB1 may include scheduling information for SIB2 and/or one or more other SIBs, and SIB2 may include scheduling information for the RAR message, the paging message, and/or one or more other SIBs. It will be apparent that other scheduling schemes may be used in other embodiments.

Figure 3:
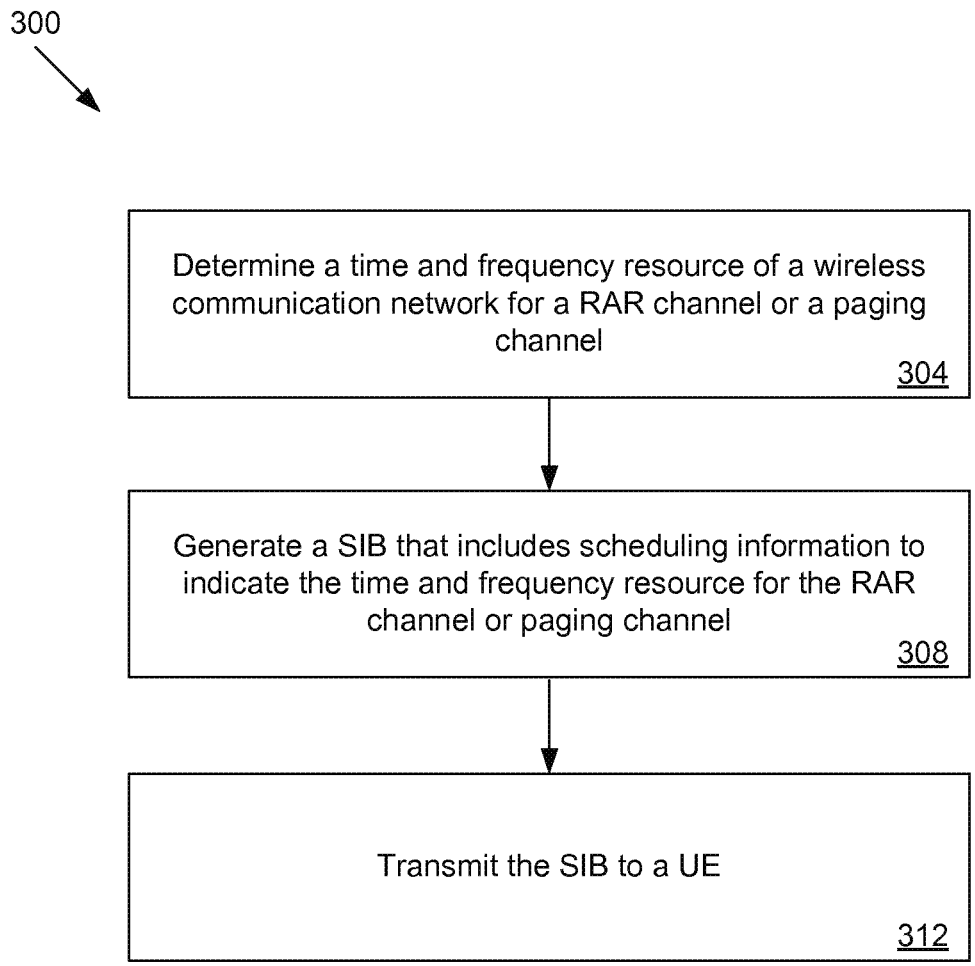
FIG. 3 is a flow diagram illustrating a method for EPDCCH-less operation that may be performed by an eNB, in accordance with various embodiments.

FIG. 3 illustrates a method 300 that may be performed by an eNB (e.g., eNB 104) for EPDCCH-less operation in accordance with various embodiments. In some embodiments, the eNB may include one or more non-transitory computer-readable media having instructions, stored thereon, that when executed case the eNB to perform the method 300.

At 304 of the method 300, the eNB may determine a time and frequency resource of a wireless communication network for a RAR message or a paging message.

At 308 of the method 300, the eNB may generate a SIB that includes scheduling information to indicate the time and frequency resource for the RAR message or paging message. The scheduling information may include, for example, one or more of: a bitmap of the subframes used for the transmission of the RAR message with respect to the timing of a physical random access channel (PRACH) preamble transmission from the UE or paging message, the starting subframe of the RAR message or paging message (e.g., with respect to SFN0), the periodicity of the RAR message or paging message, the frequency location of the RAR message or paging message, an MCS for the RAR message or paging message, and/or configuration information associated with repeated transmission of the RAR message or paging message (e.g., the number of repeated subframes, the type of repeated transmission (e.g., Chase combining or incremental redundancy), the redundancy version of the repeated transmission, and/or parameters for frequency hopping).

At 312 of the method 300, the eNB may transmit the SIB to a UE (e.g., UE 108) to enable the UE to use the RAR message or paging message.

Figure 4:
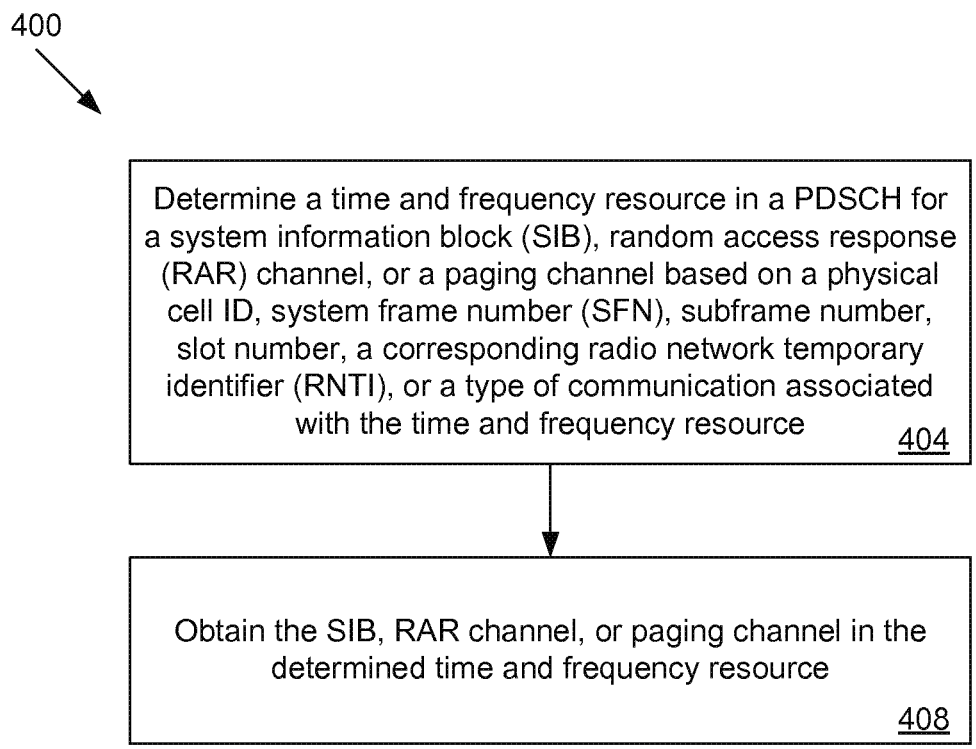
FIG. 4 is a flow diagram illustrating another method for EPDCCH-less operation that may be performed by a UE, in accordance with various embodiments.

FIG. 4 illustrates another method 400 that may be performed by a UE (e.g., UE 108) for EPDCCH-less operation in accordance with various embodiments. In some embodiments, the UE may include one or more non-transitory computer-readable media having instructions, stored thereon, that when executed case the UE to perform the method 400.

At 404 of the method 400, the UE may determine a time and frequency resource in a PDSCH for a system information block (SIB), random access response (RAR) message, or a paging message based on a physical cell ID, system frame number (SFN), subframe number, slot number, a corresponding radio network temporary identifier (RNTI), or a type of communication associated with the time and frequency resource.

At 408 of the method 400, the UE may obtain the SIB, RAR message, or paging message in the determined time and frequency resource.

In some embodiments, the UE may determine a time location of the time and frequency resource based on the type of communication associated with the time and frequency resource, and determine a frequency location of the time and frequency resource based on a physical cell ID, system frame number (SFN), subframe number, slot number, a corresponding radio network temporary identifier (RNTI), or a type of communication associated with the time and frequency resource.

Figure 5:
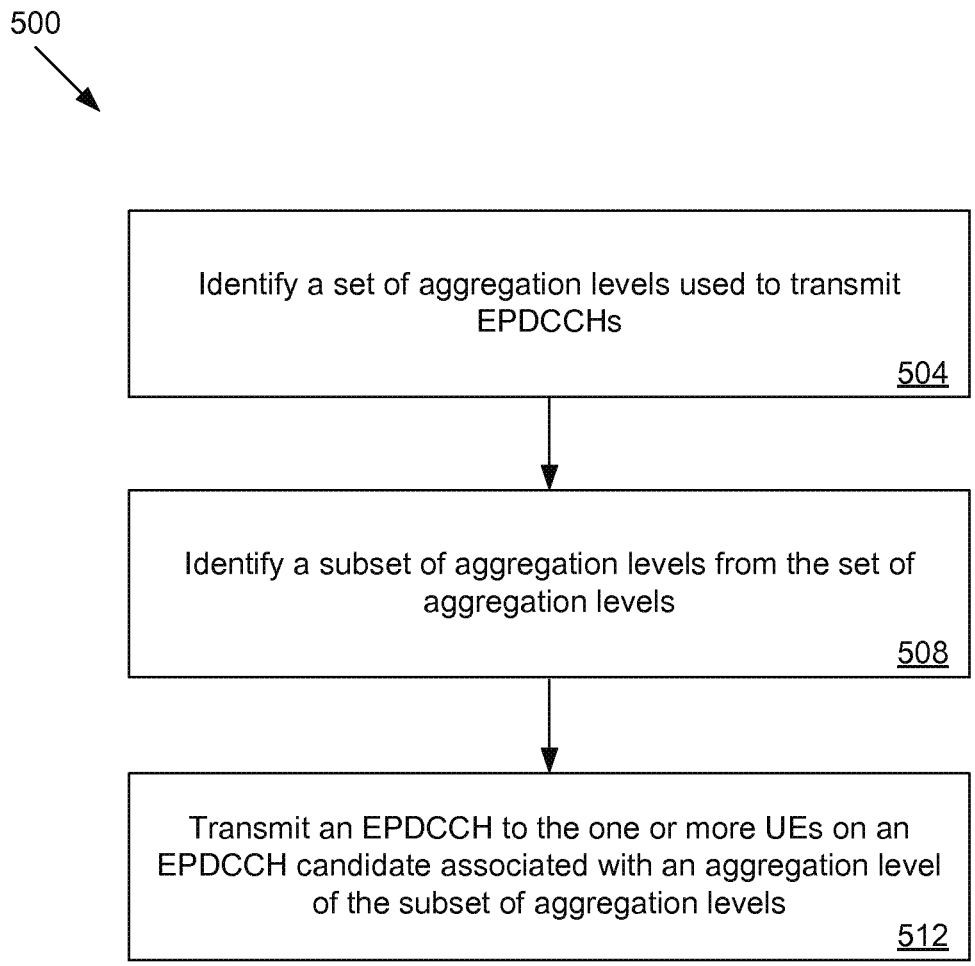
FIG. 5 is a flow diagram illustrating a method that may be performed by an eNB to configure a subset of aggregation levels for PDCCH or EPDCCH transmission for a UE, in accordance with various embodiments.

FIG. 5 illustrates a method 500 that may be performed by an eNB (e.g., eNB 104) in accordance with various embodiments. In some embodiments, the eNB may include one or more non-transitory computer-readable media having instructions, stored thereon, that when executed case the eNB to perform the method 500.

At 504 of the method 500, the eNB may identify a set of aggregation levels used to transmit EPDCCHs (e.g., for non-MTC UEs and/or full-bandwidth UEs such as HTC UEs). The eNB may transmit an EPDCCH for the non-MTC UEs and/or full-bandwidth UEs on a EPDCCH candidate associated with an aggregation level from the identified set of aggregation levels.

At 508 of the method 500, the eNB may identify a subset of aggregation levels from the set of aggregation levels. The subset of aggregation levels may be used for transmitting an EPDCCH to one or more UEs (e.g., UE 108). In some embodiments, the subset of aggregation levels may be used for MTC UEs with reduced bandwidth and/or UEs in enhanced coverage mode. In some embodiments, the eNB may determine the aggregation levels that are included in the subset of aggregation levels based on a location or a RSRP/path loss measurement report associated with the one or more UEs.

At 512 of the method 500, the eNB may transmit an EPDCCH to the one or more UEs on an EPDCCH candidate associated with an aggregation level of the subset of aggregation levels. In some embodiments, the eNB may transmit, to the one or more UEs, configuration information to indicate the subset of aggregation levels.

Although method 500 is described with reference to an EPDCCH, the method 500 may be additionally or alternatively used for a PDCCH.

Figure 6:
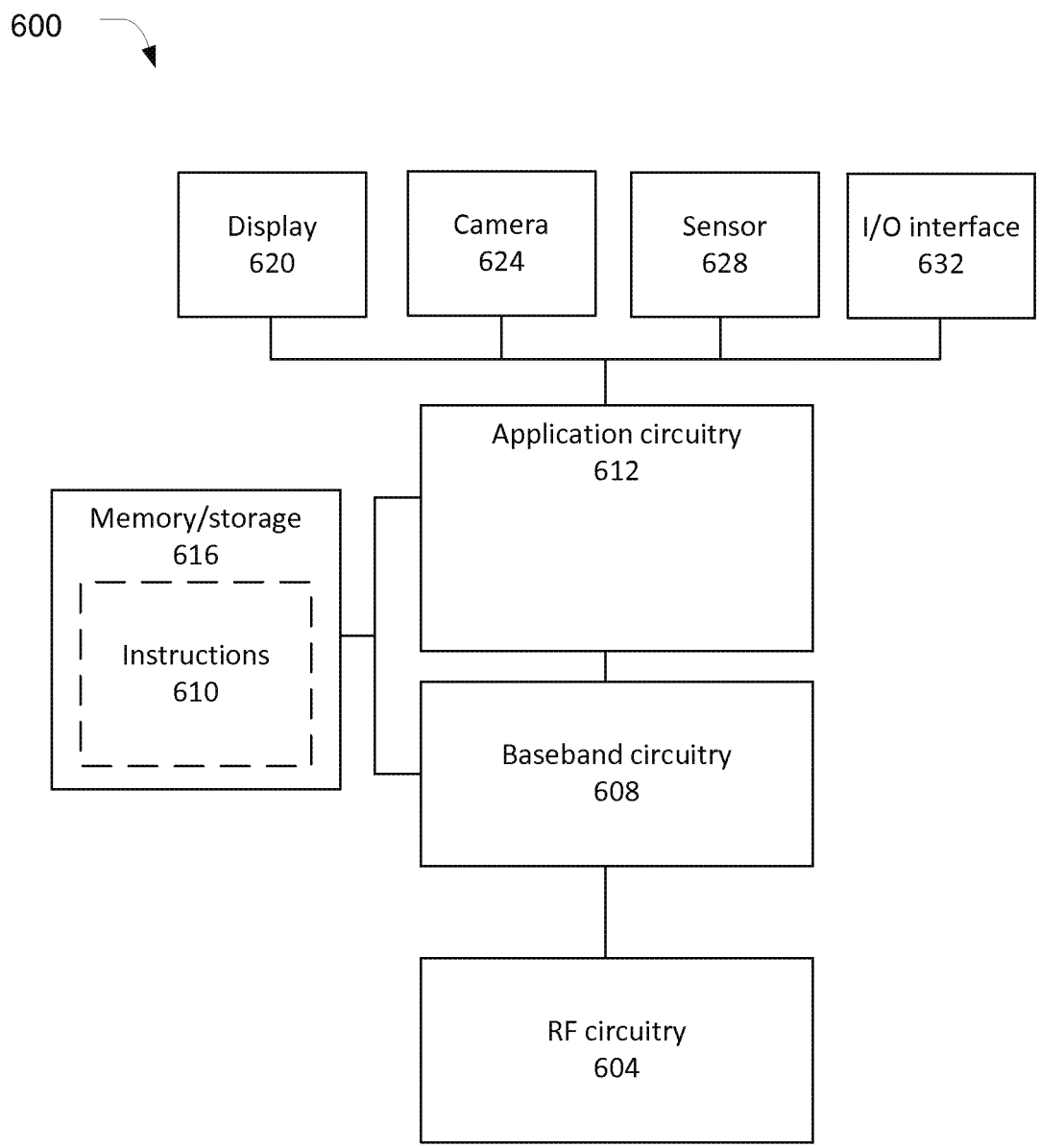
FIG. 6 is a block diagram illustrating a computing device adapted to operate in a wireless communication network, in accordance with various embodiments.

The UE 108 and/or eNB 104 as described herein may be implemented into a system using any suitable hardware, firmware, and/or software configured as desired. For example, FIG. 6 illustrates, for one embodiment, an example system 600 that may correspond to a UE (e.g., UE 108) or eNB (e.g., eNB 104). Additionally, or alternatively, the system 600 may be adapted to perform one or more of the processes described herein (e.g., method 200, 300, 400, and/or 500). The system 600 may include radio frequency (RF) circuitry 604, baseband circuitry 608, application circuitry 612, memory/storage 616, display 620, camera 624, sensor 628, and input/output (I/O) interface 632, coupled with each other at least as shown.

The application circuitry 612 may include circuitry such as, but not limited to, one or more single-core or multi-core processors. The processor(s) may include any combination of general-purpose processors and dedicated processors (e.g., graphics processors, application processors, etc.). The processors may be coupled with memory/storage 616 and configured to execute instructions stored in the memory/storage 616 to enable various applications and/or operating systems running on the system 600.

The baseband circuitry 608 may include circuitry such as, but not limited to, one or more single-core or multi-core processors. The processor(s) may include a baseband processor. The baseband circuitry 608 may handle various radio control functions that enable communication with one or more radio networks via the RF circuitry 604. The radio control functions may include, but are not limited to, signal modulation, encoding, decoding, radio frequency shifting, etc. In some embodiments, the baseband circuitry 608 may provide for communication compatible with one or more radio technologies. For example, in some embodiments, the baseband circuitry 608 may support communication with an E-UTRAN and/or other wireless metropolitan area networks (WMAN), a wireless local area network (WLAN), or a wireless personal area network (WPAN). Embodiments in which the baseband circuitry 608 is configured to support radio communications of more than one wireless protocol may be referred to as multi-mode baseband circuitry.

In various embodiments, baseband circuitry 608 may include circuitry to operate with signals that are not strictly considered as being in a baseband frequency. For example, in some embodiments, baseband circuitry 608 may include circuitry to operate with signals having an intermediate frequency, which is between a baseband frequency and a radio frequency.

In some embodiments, the communication circuitry 124 and/or the control circuitry 112 may be embodied in the application circuitry 612 and/or the baseband circuitry 608. Alternatively, the communication circuitry 124 may be embodied in the RF circuitry 604.

RF circuitry 604 may enable communication with wireless networks using modulated electromagnetic radiation through a non-solid medium. In various embodiments, the RF circuitry 604 may include switches, filters, amplifiers, etc., to facilitate the communication with the wireless network.

In various embodiments, RF circuitry 604 may include circuitry to operate with signals that are not strictly considered as being in a radio frequency. For example, in some embodiments, RF circuitry 604 may include circuitry to operate with signals having an intermediate frequency, which is between a baseband frequency and a radio frequency.

In some embodiments, some or all of the constituent components of the baseband circuitry 608, the application circuitry 612, and/or the memory/storage 616 may be implemented together on a system on a chip (SOC).

Memory/storage 616 may be used to load and store data and/or instructions, for example instructions 610 which may be configured to cause system 600 to carry out any portion of the processes described herein (e.g., method 200, 300, 400, and/or 500). Memory/storage 616 for one embodiment may include any combination of suitable volatile memory (e.g., dynamic random access memory (DRAM)) and/or non-volatile memory (e.g., Flash memory).

In various embodiments, the I/O interface 632 may include one or more user interfaces designed to enable user interaction with the system 600 and/or peripheral component interfaces designed to enable peripheral component interaction with the system 600. User interfaces may include, but are not limited to, a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, sensor 628 may include one or more sensing devices to determine environmental conditions and/or location information related to the system 600. In some embodiments, the sensors may include, but are not limited to, a gyro sensor, an accelerometer, a proximity sensor, an ambient light sensor, and a positioning unit. The positioning unit may also be part of, or interact with, the baseband circuitry 608 and/or RF circuitry 604 to communicate with components of a positioning network, e.g., a global positioning system (GPS) satellite.

In various embodiments, the display 620 may include a display (e.g., a liquid crystal display, a touch screen display, etc.).

In some embodiments, the system 600 may be a computing device adapted for MTC operation, such as, but not limited to, a smart metering device, payment device (e.g., a "pay-as-you-drive" device), a vending machine, a telematics system (e.g., a system adapted for tracking and tracing of vehicles), an appliance, a security system (e.g., a surveillance device), and the like. Alternatively, or additionally, the system 600 may be a mobile computing device adapted for HTC operation, such as, but not limited to, a laptop computing device, a tablet computing device, a netbook, an ultrabook, a smartphone, etc. In various embodiments, system 600 may have more or fewer components, and/or different architectures.

Some non-limiting Examples are provided below.

Example 1 is an apparatus to be employed in a user equipment (UE), the apparatus comprising: communication circuitry to cause a radio frequency (RF) circuit to communicate with an evolved Node B (eNB) via a wireless communication network; and control circuitry, coupled to the communication circuitry, to: receive, via the communication circuitry, a master information block (MIB) on a physical broadcast channel (PBCH) that includes scheduling information to indicate a time and frequency resource of a physical downlink shared channel (PDSCH) for a system information block (SIB); and receive the SIB in the time and frequency resource of the PDSCH based on the scheduling information.

Example 2 is the UE of Example 1, wherein the SIB is a first SIB, wherein the time and frequency resource is a first time and frequency resource, wherein the first SIB includes scheduling information to indicate a second time and frequency resource for a second SIB, and wherein the control circuitry is further to receive the second SIB in the second time and frequency resource based on the scheduling information for the second SIB.

Example 3 is the UE of Example 1, wherein the MIB, SIB, or another SIB includes information to indicate at least in part a time and frequency resource for a random access response (RAR) resource or a paging message, and wherein the control circuitry is to utilize the RAR resource or paging message based on the information.

Example 4 is the UE of Example 1, wherein the control circuitry is to receive, via the communication circuitry, an enhanced physical downlink control channel (E)PDCCH in a common search space, the (E)PDCCH including information to schedule a random access response (RAR) resource or a paging message.

Example 5 is the UE of Example 1, wherein the UE is a machine-type communication (MTC) UE.

Example 6 is the UE of any one of Examples 1 to 5, wherein the received SIB is a first instance of the SIB, and wherein the control circuitry is further to: receive a second instance of the SIB; and decode the SIB based on the first and second instances of the SIB using chase combining or incremental redundancy.

Example 7 is the UE of Example 6, wherein the control circuitry is further to receive an indicator to indicate whether the control circuitry is to use chase combining or incremental redundancy to decode the SIB.

Example 8 is the UE of Example 6, wherein the indicator includes a redundancy version pattern.

Example 9 is the UE of Example 1, wherein the scheduling information includes a bitmap of a subframe used for transmission of the SIB, a starting subframe of the SIB, a periodicity of the SIB a frequency location of the SIB, multiplexing and coding (MCS) scheme to be used for the SIB, or a configuration of repeated transmission of the SIB.

Example 10 is one or more non-transitory computer-readable media having instructions, stored thereon, that when executed cause an evolved Node B (eNB) to: determine a time and frequency resource of a wireless communication network for a random access response (RAR) message or a paging message; generate a system information block (SIB) that includes information to indicate at least in part the time and frequency resource for the RAR message or paging message; and transmit the SIB to a user equipment (UE) to enable the UE to use the RAR message or paging message.

Example 11 is the one or more media of Example 10, wherein the SIB is SIB2.

Example 12 is the one or more media of Example 10, wherein the instructions, when executed, further cause the eNB to repeat transmission of the SIB to the UE.

Example 13 is the one or more media of Example 12, wherein the instructions, when executed, further cause the eNB to transmit an indicator to indicate whether the UE is to use chase combining or incremental redundancy to decode the SIB.

Example 14 is the one or more media of Example 12, wherein the instructions, when executed, further cause the eNB to transmit a redundancy version pattern associated with the repeated transmission of the SIB.

Example 15 is the one or more media of any one of Examples 10 to 14, wherein the time and frequency resource is a first time and frequency resource, and wherein the instructions, when executed, further cause the eNB to transmit a master information block (MIB) that includes scheduling information to indicate at least in part a second time and frequency resource for the SIB or another SIB.

Example 16 is one or more non-transitory computer-readable media having instructions, stored thereon, that when executed cause a user equipment (UE) to: determine a time and frequency resource in a PDSCH for a system information block (SIB), random access response (RAR) message, or a paging message based at least in part on one or more of: a physical cell ID, system frame number (SFN), subframe number, slot number, a corresponding radio network temporary identifier (RNTI), or a type of communication associated with the time and frequency resource; and monitor for the SIB, RAR message, or paging message in the determined time and frequency resource.

Example 17 is the one or more media of Example 16, wherein the instructions, when executed, further cause the UE to determine a time location of the time and frequency resource based on the type of communication associated with the time and frequency resource, and determine a frequency location of the time and frequency resource based on a physical cell ID, system frame number (SFN), subframe number, slot number, a corresponding radio network temporary identifier (RNTI), or a type of communication associated with the time and frequency resource.

Example 18 is the one or more media of Example 17, wherein the type of communication is an SIB type.

Example 19 is the one or more media of Example 17, wherein the type of communication is a RAR message type.

Example 20 is the one or more media of Example 17, wherein the type of communication is a paging message type.

Example 21 is the one or more media of any one of Examples 16 to 20, wherein the instructions, when executed, cause the UE to obtain repeated transmissions of the SIB, RAR message, or paging message.

Example 22 is an apparatus to be employed in an evolved Node B (eNB), the apparatus comprising: communication circuitry to cause a radio frequency (RF) circuit to communicate with a user equipment (UE) via a wireless communication network; and control circuitry, coupled to the communication circuitry, to: identify a set of aggregation levels used to transmit enhanced physical downlink control channels (EPDCCHs); determine, for a user equipment (UE), a subset of aggregation levels from the set of aggregation levels; and transmit, via the communication circuitry, an EPDCCH to the UE on an EPDCCH candidate associated with an aggregation level of the subset of aggregation levels.

Example 23 is the eNB of Example 22, wherein the control circuitry is to transmit, to the UE via the communication circuitry, configuration information to indicate the subset of aggregation levels.

Example 24 is the eNB of Example 22, wherein the control circuitry is to determine the subset of aggregation levels based on a location or a received signal received power path loss measurement report associated with the UE.

Example 25 is the eNB of any one of Examples 22 to 24, wherein the UE is a machine-type communication UE.

Some portions of the preceding detailed description have been presented in terms of algorithms and symbolic representations of operations on data bits within a computer memory. These algorithmic descriptions and representations are the ways used by those skilled in the data processing arts to most effectively convey the substance of their work to others skilled in the arts. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

Embodiments of the invention also relate to an apparatus for performing the operations herein. Such a computer program is stored in a non-transitory computer-readable medium. A machine-readable medium includes any mechanism for storing information in a form readable by a machine (e.g., a computer). For example, a machine-readable (e.g., computer-readable) medium includes a machine- (e.g., a computer-) readable storage medium (e.g., read only memory (ROM), random access memory (RAM), magnetic disk storage media, optical storage media, flash memory devices).

The processes or methods depicted in the preceding figures can be performed by processing logic that comprises hardware (e.g., circuitry, dedicated logic, etc.), software (e.g., embodied on a non-transitory computer-readable medium), or a combination of both. Although the processes or methods are described above in terms of some sequential operations, it should be appreciated that some of the operations described can be performed in a different order. Moreover, some operations can be performed in parallel rather than sequentially.

Embodiments of the present invention are not described with reference to any particular programming language. It will be appreciated that a variety of programming languages can be used to implement the teachings of embodiments of the invention as described herein. In the foregoing Specification, embodiments of the invention have been described with reference to specific exemplary embodiments thereof. It will be evident that various modifications can be made thereto without departing from the broader spirit and scope of the invention as set forth in the following claims. The Specification and drawings are, accordingly, to be regarded in an illustrative sense rather than a restrictive sense.

What is claimed is:

1. An apparatus to be employed in a user equipment (UE), the apparatus comprising:
    a receiver configured to communicate with a base station (BS) via a wireless communication network; and
    control circuitry, coupled to the receiver, to:
        receive, via the receiver, a master information block (MIB) on a physical broadcast channel (PBCH), the MIB comprising scheduling information to indicate a time and frequency resource of a physical downlink shared channel (PDSCH) for reception of an instance of a system information block (SIB), wherein the scheduling information includes a bitmap of a subframe used for transmission of the SIB, a starting subframe of the SIB, a periodicity of the SIB, a frequency location of the SIB, and a modulation and coding (MCS) scheme to be used for the SIB;
        receive, via the receiver, the instance of the SIB on the time and frequency resource of the PDSCH based on the scheduling information;
        receive, via the receiver, a second instance of the SIB; and
        decode the SIB using the instance and the second instance of the SIB.

2. The apparatus of claim 1, wherein the SIB is a first SIB, wherein the time and frequency resource is a first time and frequency resource, wherein the first SIB includes scheduling information to indicate a second time and frequency resource for a second SIB, and wherein the control circuitry is further to receive, via the receiver, the second SIB in the second time and frequency resource based on the scheduling information for the second SIB.

3. The apparatus of claim 1, wherein the MIB, SIB, or another SIB includes information to indicate at least in part a time and frequency resource for reception of a random access response (RAR) resource or a paging message, and wherein the control circuitry is to utilize the RAR resource or paging message based on the information.

4. The apparatus of claim 1, wherein the control circuitry is to receive, via the receiver, an enhanced physical downlink control channel (E)PDCCH in a common search space, the (E)PDCCH including information to schedule a random access response (RAR) resource or a paging message.

5. The apparatus of claim 1, wherein the UE is a machine-type communication (MTC) UE.

6. The apparatus of claim 1 wherein the control circuitry is further to:
    decode the SIB using the instance and second instance of the SIB using chase combining or incremental redundancy.

7. The apparatus of claim 6, wherein the control circuitry is further to identify an indicator to indicate whether the control circuitry is to use chase combining or incremental redundancy to decode the SIB.

8. The apparatus of claim 7, wherein the indicator includes a redundancy version pattern.

9. One or more non-transitory computer-readable media having instructions, stored thereon, that when executed cause a base station to:
    determine a time and a first frequency resource of a wireless communication network for a random access response (RAR) message or a paging message;
    generate a system information block (SIB) that includes information to indicate at least in part the time and first frequency resource for the RAR message or paging message;
    transmit, using a second frequency resource different than the first frequency resource, the SIB to a user equipment (UE) as a first instance of the SIB on a physical downlink shared channel (PDSCH) to enable the UE to use the RAR message or paging message; and
    repeat transmission of the SIB to the UE as a second instance of the SIB;
    wherein the UE is to decode the SIB using the first instance and the second instance of the SIB.

10. The one or more media of claim 9, wherein the SIB is SIB2.

11. The one or more media of claim 9, wherein the instructions, when executed, further cause the base station to transmit an indicator to indicate whether the UE is to use chase combining or incremental redundancy to decode the SIB.

12. The one or more media of claim 9, wherein the instructions, when executed, further cause the base station to transmit a redundancy version pattern associated with the repeated transmission of the SIB.

13. The one or more media of claim 9, wherein the time and frequency resource is a first time and frequency resource, and wherein the instructions, when executed, further cause the base station to transmit a master information block (MIB) that includes scheduling information to indicate at least in part a second time and the second frequency resource for the SIB or another SIB.

14. One or more non-transitory computer-readable media having instructions, stored thereon, that when executed cause a user equipment (UE) to:
    determine, without receipt of a corresponding physical downlink control channel (PDCCH), a time and frequency resource in a physical downlink shared channel (PDSCH) for a system information block (SIB) based at least in part on one or more of: a physical cell ID, system frame number (SFN), subframe number, slot number, and a corresponding radio network temporary identifier (RNTI);
    monitor for the SIB in the determined time and frequency resource; and
    obtain a first transmission and a second transmission of the SIB and decode the SIB using the first and second transmissions of the SIB.

15. The one or more media of claim 14, wherein the instructions, when executed, further cause the UE to determine a time location of the time and frequency resource based on a type of communication associated with the time and frequency resource, and determine a frequency location of the time and frequency resource based on a physical cell ID, system frame number (SFN), subframe number, slot number, a corresponding radio network temporary identifier (RNTI), or a type of communication associated with the time and frequency resource.

16. The one or more media of claim 15, wherein the type of communication is an SIB type.

17. An apparatus to be employed in a user equipment (UE), the apparatus comprising:
communication circuitry to cause a radio frequency (RF) circuit to communicate with a base station via a wireless communication network; and
control circuitry, coupled to the communication circuitry, to:
decode, based on a master information block (MIB) received via the communication circuitry on a physical broadcast channel (PBCH), scheduling information to indicate a time and frequency resource for reception of an instance of a system information block (SIB); and
identify a received instance of the SIB in the time and frequency resource based on the scheduling information, wherein the SIB includes information to indicate at least in part a time and frequency resource for reception of a random access response (RAR) resource or a paging message;
identify a received second instance of the SIB; and
decode the SIB using the instance of the SIB and the second instance of the SIB.

18. The apparatus of claim 17, wherein the scheduling information includes a bitmap of a subframe used for transmission of the SIB, a starting subframe of the SIB, a periodicity of the SIB, a frequency location of the SIB, and a modulation and coding (MCS) scheme to be used for the SIB.

19. The apparatus of claim 17 wherein the control circuitry is further to:
decode the SIB using the instance of the SIB and the second instance of the SIB using chase combining or incremental redundancy.

20. The apparatus of claim 19, wherein the control circuitry is further to receive an indicator to indicate whether the control circuitry is to use chase combining or incremental redundancy to decode the SIB.

* * * * *

UNITED STATES PATENT AND TRADEMARK OFFICE
CERTIFICATE OF CORRECTION

PATENT NO. : 11,191,064 B2  
APPLICATION NO. : 15/501152  
DATED : November 30, 2021  
INVENTOR(S) : Gang Xiong et al.

It is certified that error appears in the above-identified patent and that said Letters Patent is hereby corrected as shown below:

In the Claims

Column 17, Line 18, in Claim 17, after "(SIB);" delete "and".

Signed and Sealed this  
Twenty-second Day of February, 2022

Drew Hirshfeld  
*Performing the Functions and Duties of the*  
*Under Secretary of Commerce for Intellectual Property and*  
*Director of the United States Patent and Trademark Office*